United States Patent [19]
Cameron et al.

[11] Patent Number: 5,189,512
[45] Date of Patent: Feb. 23, 1993

[54] HELMET INTEGRATED DISPLAY SYSTEM

[75] Inventors: Michael H. Cameron, Woodland Hills; James F. Cameron, Beverly Hills, both of Calif.

[73] Assignee: Camair Research, Inc., Burbank, Calif.

[21] Appl. No.: 724,196

[22] Filed: Jul. 1, 1991

[51] Int. Cl.⁵ .............................................. H04N 7/18
[52] U.S. Cl. ...................................... 358/93; 358/104; 359/610; 340/705
[58] Field of Search ........................ 358/103, 104, 93; 359/610; 340/705

[56] References Cited

U.S. PATENT DOCUMENTS

| | | | |
|---|---|---|---|
| 2,872,840 | 2/1959 | Stanton | 358/93 |
| 4,017,168 | 4/1977 | Brown | 352/243 |
| 4,605,959 | 8/1986 | Colbaugh | 358/93 |
| 4,636,866 | 1/1987 | Hattori | 358/236 |
| 4,672,436 | 6/1987 | Hawthorne | 358/93 |
| 4,722,601 | 2/1988 | McFarlane | 356/152 |
| 4,729,648 | 3/1988 | Armstrong | 359/610 |
| 4,810,078 | 3/1989 | Armstrong | 359/610 |
| 5,003,300 | 3/1991 | Wells | 340/705 |
| 5,040,058 | 8/1991 | Beamon, III | 358/103 |

OTHER PUBLICATIONS

"The Private Eye", Reflection Technology.
"Agile Eye".

Primary Examiner—John K. Peng
Attorney, Agent, or Firm—Blakely, Sokoloff, Taylor, Zafman

[57] ABSTRACT

A Helmet Integrated Display (HID) system and device for remotely viewing a video signal, wherein the device is worn on a cameraman's head. The device has a housing containing a head-mounted, high resolution CRT to produce a visible image from an incoming video signal generated by an input video source such as a STEADI-CAM video tap camera. Through a network of mirrors and a double convex lens, the visible image is converted into a virtual image, which image is presented to a sighting eye of the cameraman. An occlusion device, also attached to the HID system, partially blocks off the view out of a non-sighting eye such that the perceived images from both eyes combine in the cerebral cortex of the cameraman's brain into one coherent image without problems of binocular rivalry. In an alternate embodiment, an RF receiver is incorporated into the HID system for receiving an RF video signal broadcast into the airwaves from the input video source, thus eliminating the need for a direct connection to the input video source.

18 Claims, 2 Drawing Sheets

HELMET INTEGRATED DISPLAY SYSTEM

BACKGROUND OF THE INVENTION

1. Field of the Invention

The present invention relates to the field of optical equipment, and more precisely, the invention relates to, but is not limited to, applications in motion picture production, The present invention is used to assist cameramen using a variety of camera stabilization or remote camera systems. Also, it may be used by puppeteers, directors, stunt coordinators, assistant directors, directors of photography or others. The present invention is for use by those requiring a view of a through-the-lens image while still retaining hands-free mobility with a majority of one's peripheral vision intact.

2. Description of the Prior Art and Related Information

There are numerous helmet mounted visual presentation devices which have been employed in a wide variety of applications including: military (air, land and sea), scientific research, education, computer peripheral systems, aerospace, industrial engineering, general aviation, undersea exploration, motor sports, as well as many other technical applications.

There is, however, generally only one device used in connection with motion picture production. That device is described by Garrett Brown in U.S. Pat. No. 4,017,168 to Brown, and in his U.S. Pat. No. Re. 32,213. The device disclosed in the Brown patents is a supportive peripheral viewfinder connected to a video tap camera on motion picture camera via a fiber optic cable. A major disadvantage of the Brown device is that it completely occludes the user's sighting or display eye, preventing any peripheral viewing in the display eye and grossly hampering depth perception in the non-display eye. Further, there is no described optical adjustment to attend to the problems encountered with refocusing or image size. Apparently, Brown's system requires that one eye focuses on the display while the other eye focuses on the much farther away general surroundings. This unbalanced focal relationship with unchecked binocular rivalry, discussed below, is undesirable and certainly would cause headaches and disorientation, making the device undesirable and dangerous if used while navigating in cluttered work areas. Hence, the Brown device does not address the need for a matting occlusion device for the non-display eye as is taught by the present invention because the device is sending two entirely separate images to the visual reception area in the brain.

Additionally, the Brown patents describe only a fiber optic link to the eyepiece with no accommodation for other external image sources.

Further, with the Brown device, there is no described visual enhancement in the form of a higher than transmitted image quality via additional lines of resolution.

Another shortcoming of the Brown viewfinder can be explained in terms of the mechanism and physiology of the human visual system. Each person has a binocular region with a binocular field of view, wherein the latter is defined as the entire area visible to both eyes at any instant and the former is the region where the fields of view of both eyes overlap. The view seen in the overlapping binocular region fuses into one image in the visual cortex of the brain, which includes a "projection area" in the occipital lobe of each brain hemisphere. This projection area maps out the image seen by both eyes.

But is a viewfinder is placed over one eye as in the Brown device, a phenomenon called binocular rivalry occurs. In general terms, binocular rivalry is when images from one eye alternately dominates over the images from the other. This phenomenon happens because the image in the field of view in one eye is significantly different than the field of view in the other eye, which is the case when the viewfinder is placed over one eye. To be sure, the focal plane of one eye is not the same as for the other eye since the object seen by the sighting eye is so much closer to that eye. Thus, the projection area in the brain is confused and cannot fuse the images from each eye.

There have been several types of efforts to overcome this problem, however. The simplest is to cover the nonsighting eye with an opaque patch, blocking out any visual information from entering that eye. But with the nonsighting eye completely covered, the cameramen loses a great deal of visual information as compared to an unobstructed eye.

A refinement over a simple eye patch is U.S. Pat. No. 4,729,648 to Armstrong, commercially marketed as "the Eyeopener." Armstrong discloses a rectangular-shaped partial eyeshield that blocks only a portion of the field of view of the non-sighting eye instead of covering the entire eye. Thus, when mounted on a camcorder, for example, the partial eyeshield blocks out only so much of the field of view as is seen through the sighting eye looking through the camcorder viewfinder. In this manner, the image from one eye complements the image from the other.

But the Armstrong device has its limitations. First, it uses a viewfinder that either completely or substantially obstructs the field of view out of the sighting eye; only the image produced by the viewfinder can be seen. Accordingly, the vision of the camera operator is impaired.

Second, because the viewfinder is positioned close to the sighting eye while the non-sighting eye, notwithstanding the partial eyeshield, has sufficient view of the surroundings, problems exist stemming from the eyes having to adjust to two focal planes. More specifically, although the binocular rivalry phenomenon may have been solved, the focal planes of the images seen by the non-sighting eye not blocked by the partial eyeshield versus the sighting eye looking at the viewfinder are not the same distance away. By analogy, the effect is if a person were to look at a far away object while simultaneously having an object lines up in the foreground, even through the images from each eye would fuse in the projection area, the eyes must re-focus from the close object to the distant object or vice versa. Therefore, the cameraman's eyes must constantly re-focus depending upon which object is being observed. This can become annoying to a cameraman who must constantly repeat the process to perform his job for many hours.

Other relevant art can be found in several military applications that employ specialized, head-mounted optical devices. For instance, a HUD (Heads Up Display) system used in fighter aircraft and ordinance delivery systems. But several of these devices that present visual information to the wearer in front of one or both eyes has revealed that most of these devices are prohibitively expensive and complex.

Further, they are generally designed with very specialized tasks in mind making them difficult and/or costly to adapt to motion picture work. Most of the military systems incorporate some form of projection system wherein the desired visual data is superimposed on a high tech translucent half-silvered mirror surface which mirror still transmits to the user/pilot all of the background visual information from his surroundings. For motion picture use, by comparison, such a feature would be undesirable because the cameraman would receive too much conflicting visual information and would not be able to concentrate solely on the camera image if he should so desire. Also with the prior art HUD systems, the cameraman does not have the control over contrast and brightness to the level which is demanded in motion picture applications.

SUMMARY OF THE INVENTION

The present invention relates to a Helmet Integrated Display system (or "HID") which is worn by a cameraman on the line and which provides a high resolution, optically adjusted video presentation over a sighting eye. In a preferred embodiment of the present invention, the image is generally provided directly from a motion picture video tap camera and can be delivered to the HID system via hard wiring, or it may be transmitted to the receiver/tuner built into the HID system. Additional information can be superimposed on the HID system image including multiple capacity frameline generation representing various lens formats, level sensing (as related to camera position) and HID level indicators as well as alpha numeric data as desired from a variety of sources. A CEI frameline generation system is provided to electronically indicate on the image viewed by the wearer the size and shape of the ultimate image recorded by the camera used in the production.

The general purpose of the HID system is to provide its wearer, usually the cameraman, who is using any number of existing camera stabilization systems or remote operated camera systems, with a display unit that allows him to effectively monitor both the camera image framing and his own movement about the movie set environment. Specifically, this system can be used in conjunction with a widely accepted professional camera stabilization system known in the art as the STEADICAM. Also, it can be used with a gyro stabilized remote actuated camera system attached to an ultralight aircraft, components of which are also used with the FASTCAM running camera system, known in the art.

With the STEADICAM, the current means of framing an image requires that the camera operator look at a monitor mounted to the STEADICAM camera unit. The limitation of this configuration is that the monitor's position is dependent on the camera's position. With such a system the cameraman is expected to maintain critical framing while simultaneously maneuvering through his often cluttered surroundings. By contrast, the present invention HID system frees the wearer of such constraints and allows him the capacity of both direct and peripheral vision in any direction regardless of camera orientation. It has been found that the need for a system such as the HID extends to other users as well, the common element being the need to view a remotely-generated video image while maintaining as much of a normal field of view as is possible.

The present invention HID system provides the wearer with a video image in the center of the field of view of his sighting or display eye when the eye is looking straight ahead. The system is designed to minimize the occlusion of peripheral vision in the display eye while providing sufficient projected image size to discern image detail.

Additionally, the present invention system provides an occlusion means which minimizes confusion to the wearer caused by images seen in the non-display eye (bright focused lights, for example) that would otherwise be superimposed over the displayed image due to the nature of binocular vision and the mixing of visual information from both eyes in the brain's visual reception areas. In a preferred embodiment, the occlusion means is a rectangular-shaped element partially blocking the view out of the non-display eye.

In contrast to the previously described Brown device, the present invention provides considerable shared information from both eyes and reduces the CRT display image size to only 14% of the overall field of view. Also, the present invention in a preferred embodiment accepts NTSC video input directly through either standard coaxial cable or by radio reception in an on-board receive/tuner from the transmission source at the video tap camera or other such broadcast information sources.

The present invention also has a visual enhancement system which is not provided in the Brown device. This system is provided by a high grade CRT on board the HID system. Additionally, the present invention has an image reversal (mirror flip) feature not present in the Brown device.

Overall, there are many features and functions of the present invention not found in any prior art device. These features and functions are set forth below with reference to the drawings which are briefly discussed as follows.

DETAILED DESCRIPTION OF THE INVENTION

The following specification describes a Helmet Integrated Display (or HID) system. In the description, specific materials and configurations are set forth in order to provide a more complete understanding of the present invention. But it is understood by those skilled in the art that the present invention can be practiced without those specific details. In some instances, well-known element are not described precisely so as not to obscure the invention.

The present invention provides a head-mounted optical display system for remotely viewing a video signal that does not impair the wearer/cameraman's field of vision. In a preferred embodiment shown in a plan view of FIG. 1, the present invention provides a HID system comprising of a light-weight support headband frame 5 made of rigid composite construction. Onto the headband frame 5 is mounted a high resolution CRT and optical package 6, which is housed in a tubular, precision-machined aluminum casing. Also mounted to the aft section of the support headband frame 5 is a rectangular-shaped aft electronics package 2, which contains a CRT drive board and high voltage circuitry. That circuitry is connected to the CRT/Optical package 6 via a cable assembly 11, illustrated in a profile view in FIG. 3.

Figure 1:
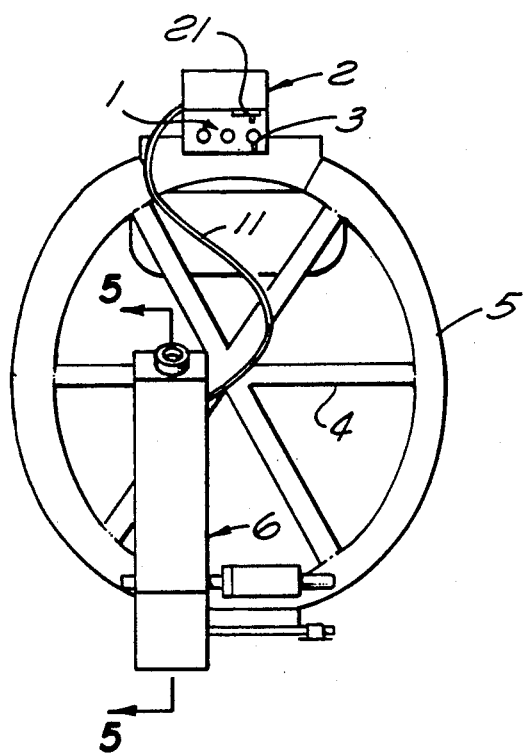
FIG. 1 is a top view of the present invention HID system.
Figure 2:
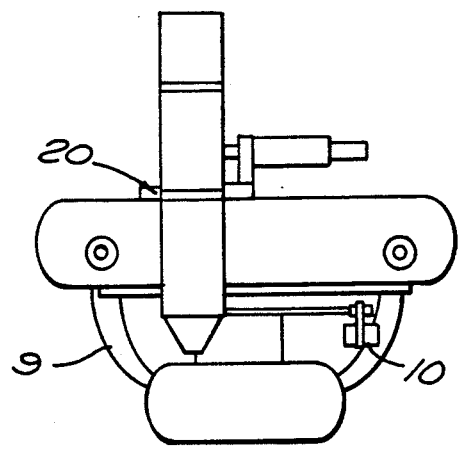
FIG. 2 is a front view of the present invention HID system.
Figure 5:
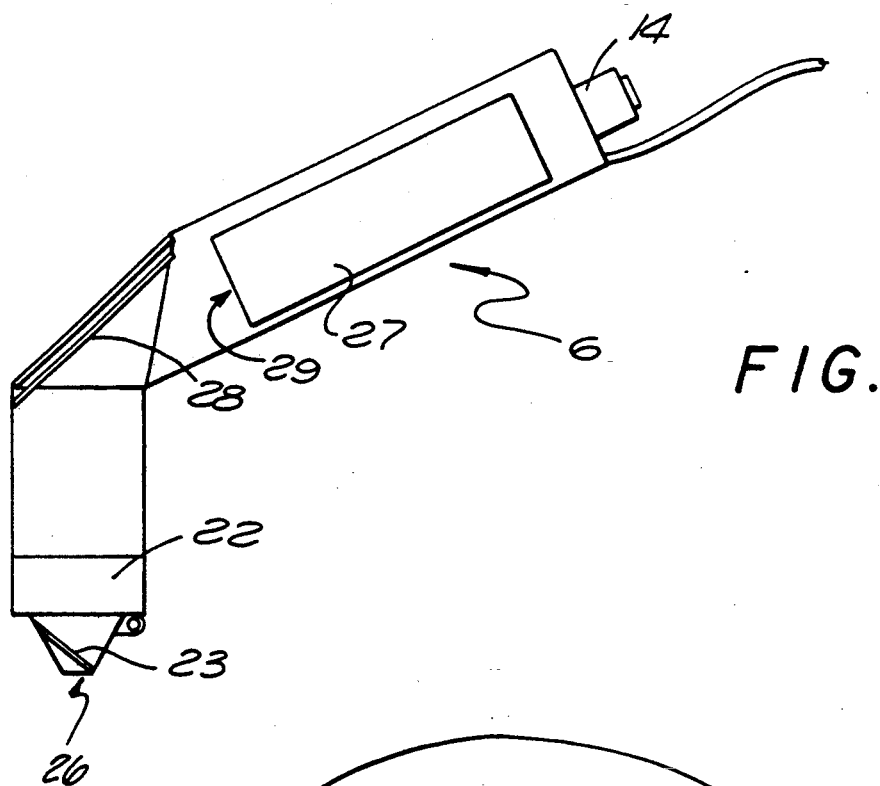
FIG. 5 is a cross-sectional view of the CRT/Optical package taken along line 5—5 of FIG. 1.

FIG. 5 is a cross-sectional view of the CRT/Optical package 6 shown in FIG. 1 taken along line 5—5. Generally speaking, the CRT/Optical package 6 merges electronics with optics to obtain a highly-specialized viewfinder. In FIG. 5, within the CRT/Optical package 6 resides a focus adjustment precision slide and vernier adjustment mechanism 14, a high resolution CRT 27, a turning mirror 28, an adjustment optical ground glass lens 22, and a final presentation mirror 23. The CRT/Optical package 6 is mounted to a linear motion precision slide 20, as shown in FIG. 2, which in turn is affixed directly to the forward section of the headband frame 5. To the precision linear motion slide 20 is affixed a vernier adjustment screw assembly 7 actuated by a half-inch diameter knurled knob. The slide adjustment assembly 20 is used to move the CRT/Optical package 6 from side to side in order to center the CRT display image 29 over the sighting eye's center field of view.

As shown in FIG. 5, the CRT/Optical package 6 is a tubular housing that has a viewfinder opening 26 at one end and a high resolution CRT 27 enclosed in the other. The high resolution CRT 27 receives input video and power signals via cable 11 from an aft electronics package 2, discussed in detail below. The CRT 27 features a display screen 29 that projects visible images to a turning mirror 28. The turning mirror reflects the visible image to a lens 22.

The lens 22 serves a special purpose. In the preferred embodiment of the present invention, the lens 22 should be a double convex type which inverts the visible images, analogous to what happens in a conventional magnifying lens. In addition, by using an optical technique known in the art of positioning the CRT display 27 (i.e., the object) within the focal length of the double convey lens 22 on the CRT side, a virtual image (of the object) is projected on to the opposite side of the lens 22. In the preferred embodiment the lens is an f 1.6 focal length, 100 mm lens.

The location of the virtual image can be adjusted. To do that, the wearer can change the positioning of the CRT display 29 relative to the lens 22 by twisting on the adjustment knob 14. Twisting the knob 14 rotates a threaded shaft which slides the entire high resolution CRT 27 forward or backward relative to the lens 22. Consequently, the perceived position of the virtual image moves as well. Image focus can be obtained this way, too.

Finally, a cooperatively disposed mirror near the front end of the CRT/Optical package 6 brings the virtual image down to eye level. Specifically, the virtual image is projected to a final presentation mirror 23. According to the present invention, both mirrors 23 and 28 are conventional, high grade, fully silvered mirrors known in the art. The virtual image appearing in the final presentation mirror 23 can then be observed through the viewfinder opening 26 positioned in front of the wearer's sighting eye.

Of course there are many other methods of bringing the virtual image of the CRT display 29 to the wearer's sighting eye 25 aside from the example just described. The foregoing description provides merely one preferred configuration.

Figure 3:
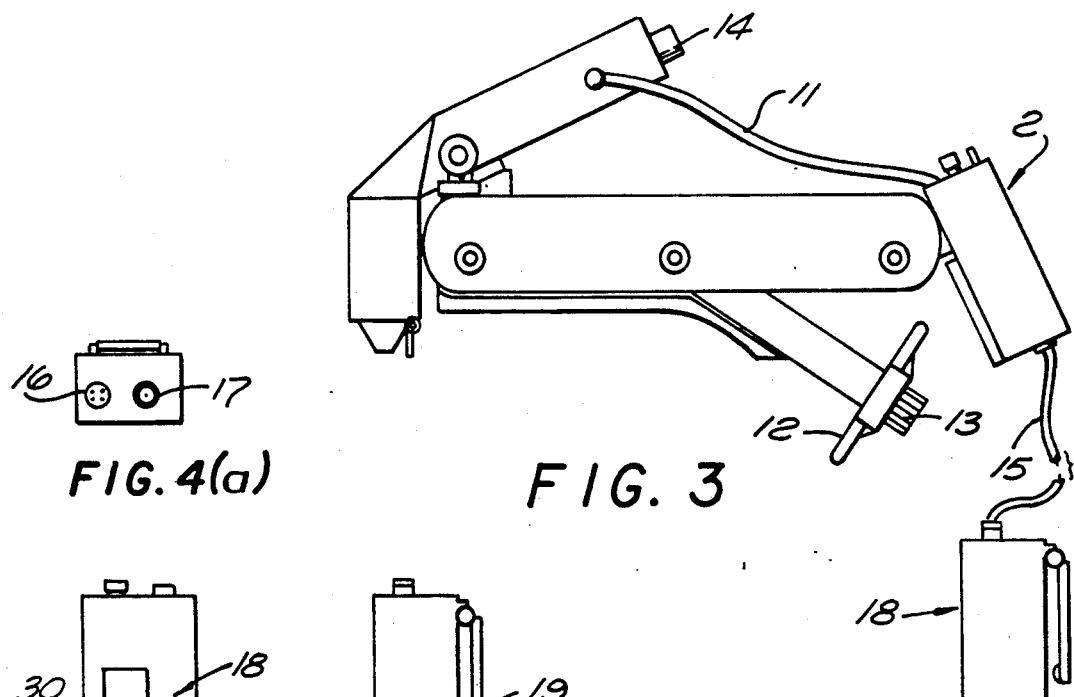
FIG. 3 is a side view of the present invention HID system.

As shown in FIGS. 2 and 3, in the preferred embodiment, a nylon web headrest is affixed within the circumference of the rigid composite headband frame 5. Affixed to the aft section of the headband frame 5 is an adjustable sizing head strap 9 which incorporates a rotary tensioning knob 13 that pulls a 4"×2" flat pad 12 evenly from center against the back of the cameraman/wearer's head on two plastic straps which are connected rigidly to the headband support frame 5.

As mentioned above, the aft electronics package 2 contains a CRT drive board and high voltage circuitry, known in the art. On the top of the aft electronics package 2 are two toggle switches 3 and two adjustment knobs 1, seen best in FIG. 1. In the preferred embodiment of the present invention, the larger toggle switch is the master power on switch which activates the HID system electronics. The small, guarded toggle switch is an image reversal switch, which when activated flips the image from right to left but retains correct vertical orientation. The image flip is achieved by using various conventional technologies such as with mirrors or electronic circuitry; thus no further discussion is needed here. A guard strip 21 of eighth-inch thick rubber is used to prevent inadvertent activation of the image reversal switch while the system electronics is powered up, which might cause damage to the system due to high voltage spikes at the time of switching. The adjustment knobs are conventional contrast and brightness adjustments required for tailoring the image for a variety of high and low light environment or for specific image enhancement capabilities.

A connection cable 15 exits the lower portion of the aft electronics package 2 and preferably extends some three feet, terminating in a quick-disconnect, four-pin male connector. This cable 15 carries 12 v power and a NTSC video signal.

Figure 4A:
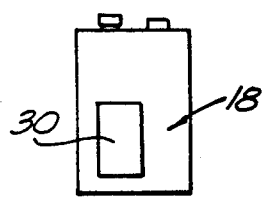
FIGS. 4(a), (b), and (c) provide top, front and side views, respectively, of a power and signal supply assembly.

Attached to the cable 15 is a 12 v battery power and signal supply assembly 18, shown in top, front and side views in FIGS. 4(a), (b) and (c), respectively. As seen in FIG. 4(a), the assembly 18 has a female section featuring a four-pin connector 16 mounted to the top of the power supply assembly 18, which is used to carry 12 v power and the NTSC video signal. Also mounted to the top of the assembly 18 is a standard 75-ohm male BNC video connector 17 used to connect the present invention to a variety of NTSC video signal sources. Those video signal sources can be, namely, a STEADICAM video tap camera output; a home video camera; any professional video camera system; a TV; a video monitor; a computer CRT output; or any other video signal source known in the art. For easy on-person carry, the assembly 18 also has a spring loaded belt clip 19.

As best illustrated in FIG. 2, the present invention also provides an occlusion device 10, mounted adjacent to the external region of the final presentation mirror 23. The occlusion 10 can be fabricated from any opaque, rigid or semi-rigid material formed into a rectangular or oval shape approximating the general shape of the perceived display eye presentation. In the preferred embodiment, the occlusion device 10 is a machined, rectangular aluminum element and is attached to the CRT/Optical package 6 by an adjustable slide shaft of chromed machine steel which allows linear adjustment in centering over the non-sighting eye as well as pivoting to an upward stowed position.

Thus in the preferred embodiment shown in FIG. 2, when a cameraman wears the present invention on his head, the view out of his left (non-sighting) eye is partially blocked by the occlusion device 10 while his right (sighting) eye can observe the images on the final presentation mirror 23 inside the CRT/Optical package 6. Naturally, the CRT/Optical package 6 and the occulsion device 10 can exchange positions so that the right (non-sighting) eye is partially blocked by the occlusion device 10 while the video image is presented to the left (sighting) eye.

The present invention incorporates the above-mentioned occlusion device 10 in order to "matte out" a corresponding region of the non-display eye to effectively eliminate binocular rivalry. Binocular rivalry if unattended to in this in this application would cause continual alternating dominant images to be projected onto the cerebral cortex. At any time in this uncompensated arrangement, the image in the field of view of one eye predominates while the other is suppressed, then suddenly the suppressed image emerges into perception and dominates the image that was predominant. Because the images seen in the medial fields of vision of each eye shore the same visual stimulus to the corresponding foveas and thence to the projection regions of the cerebral cortex, images seen in one eye can be superimposed in the reception areas in the brain to appear as though perceived from a source seen by the other eye.

How the above discussion relates to the present invention HID system is that, if, for example, a bright light is seen in the medial region of binocular vision in the non-sighting eye, the brain may superimpose this bright light onto the presentation at the cerebral cortex projection area as a bright light over the sighting or display eye information stimulus. This condition is of course highly undesirable and, although it is controllable by concentration and practice of eye dominance, it remains best attended to by use of the aforementioned occlusion device 10 and/or as discussed below, the use of a single horoptic focus for both eyes.

Adjusted Viewing Optics

A principal design characteristic of the present invention HID system is the adjusted viewing optical arrangement. In particular, the preferred embodiment has optically placed the perceived focal distance of the CRT display image at approximately 10 feet through a system of lenses and physical helmet mounting, already detailed above. This arrangement eliminates the need for the wearer to grossly refocus either the display eye or the non-display eye or both eyes in conjunction when the attention within the visual field is directed away from the CRT display in the display eye as may be the case when maneuvering about obstacles on a crowded movie set. In other words, very little precious time is lost during a re-focus and consequently the wearer's attention can be shifted from the display to his surroundings repeatedly and quickly without discomfort or disorientation. Some re-focus may be necessary when viewing surroundings removed from the 10 foot horoptic plane; however, they are fairly minimal and hardly perceptible in most cases. Experience has shown that there is an acclamation period of 2 to 3 hours during which a user becomes accustomed to focusing on the image and controlling the dominance of the display eye. After about one week of use, the invention is much easier to use. With the display image presented at a focal distance of 10 feet, it is approximately the same as viewing a 42" diagonal screen TV in focus at 10 feet.

The CRT image and associated support elements occupy less than 30% and preferably about only 14% of the overall field of view in the display eye. In the preferred embodiment, the rectangular image is presented at a total of 16° horizontally in the center of the field of vision in the display eye and 12° total vertically from center. The region directly above the upper most portion of the CRT image is totally occluded 17° wide total from center as a result of the physical form of the lens and mirror holder configuration. It will be appreciated by persons of ordinary skill in the art that variations in the range of the field of viewing may be made without departing from the spirit and scope of the present invention. This arrangement affords the wearer with an extraordinary peripheral field of vision as this allows some visual stimulus common to both eyes in the medial binocular field. Further, this arrangement prevents the undesirable disorientation and high percentage of occlusion associated with CRT images viewed solely with one eye while squinting the other eye closed, as is the case with current video camera CRT displays held up to the eye. Indeed, a main reason the present invention differs from the "Eyeopener" (U.S. Pat. No. 4,729,648 to Armstrong) mentioned above, is that the present invention has accomplished almost all of the benefits of an occlusion device for viewing a CRT close to the eye by having the CRT image adjusted to the appropriate horoptic range of the desired ambience and reducing the image size to a mere 14% of the available imagery to the display eye instead of totally occluding the display eye as is the case with most all video camera CRT viewers.

The current arrangement of the present invention HID system is essentially a semi "dichroptic" system in that it provides a high percentage of shared visual stimulus from both eyes to the visual cerebral cortex region where projection of fused imagery is presented, but at the same time is presenting two separate images from both eyes in the centroid region of the medial binocular visual field. Although it is fact that a true dichroptic arrangement will create binocular rivalry complete with all of the attendant problems associated with such a visual disparity, the present invention HID system has minimized those effects by establishing a single focal horopter for both eyes coupled with minimal binocular medial visual field intrusion by the display CRT image. It is still possible with the present invention to concentrate on which eye the wearer is allowed to be more dominant. This can result in the use of the display image as primary visual information to the brain with secondary peripheral imagery provided for navigation and target awareness, or it can result in secondary display imagery from the CRT which appears translucent while one's surroundings become primary and are superimposed over the display eye imagery. The translucent image is a "fill in effect" created by the non-display eye collecting visual stimulus from the medial binocular field from the same area that would be seen by the display eye were it not covered by the display imagery. Generally, because of the focus ranges and subsequent broad depth of field that exists, it is most common while using the HID system to experience an in focus floating CRT image on an in focus ambient surrounding background. This is actually a delightful experience and is almost at once accepted by the brain.

Naturally, the present invention is not limited to the preferred embodiment described above. Many modifications are possible without departing from the breadth of this disclosure. For example, in an alternate embodiment (not shown), the support headband frame can be constructed using two plastic molded sections (upper and lower) fused together, to which is attached the nylon head rest, the CRT/Optical package, and headband sizing adjuster assembly. The high voltage circuits and CRT drive electronics may be housed within a rectangular shape molded into the upper and lower headband support frame. The CRT/Optical package can be enclosed in a two-piece (side by side) plastic molded housing with molded-in positional holding frames for the internal devices such as the CRT, focus adjustment assembly, lenses, mirrors, etc. The linear motion slide assembly can be replaced with a simplified track or rod-type slide adjustment which incorporates a tensioning lock lever. The high voltage lines and CRT electronic connection lines to and from the CRT and headband electronics enclosure can have quick-disconnect couplings on all the cable assemblies. Finally, the precision optical lens could be fabricated using plastic instead of glass for cost savings.

Figure 4B:
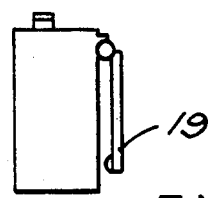
Figure 4C:
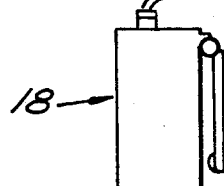

In another alternate embodiment, as shown in FIG. 4b a conventional RF receiver 30 can be incorporated into the power supply assembly 18 for receiving the input video source signal. Consequently, the BNC video connector 17 and its associated cable can be eliminated. In this manner, the video source is not hard-wired to the present invention HID system through a cable, which limits mobility of the cameraman. Rather, the video source can broadcast its signal through the airwaves by convention means known in the art for reception by the self-contained RF receiver inside the assembly 18.

Figure 6:
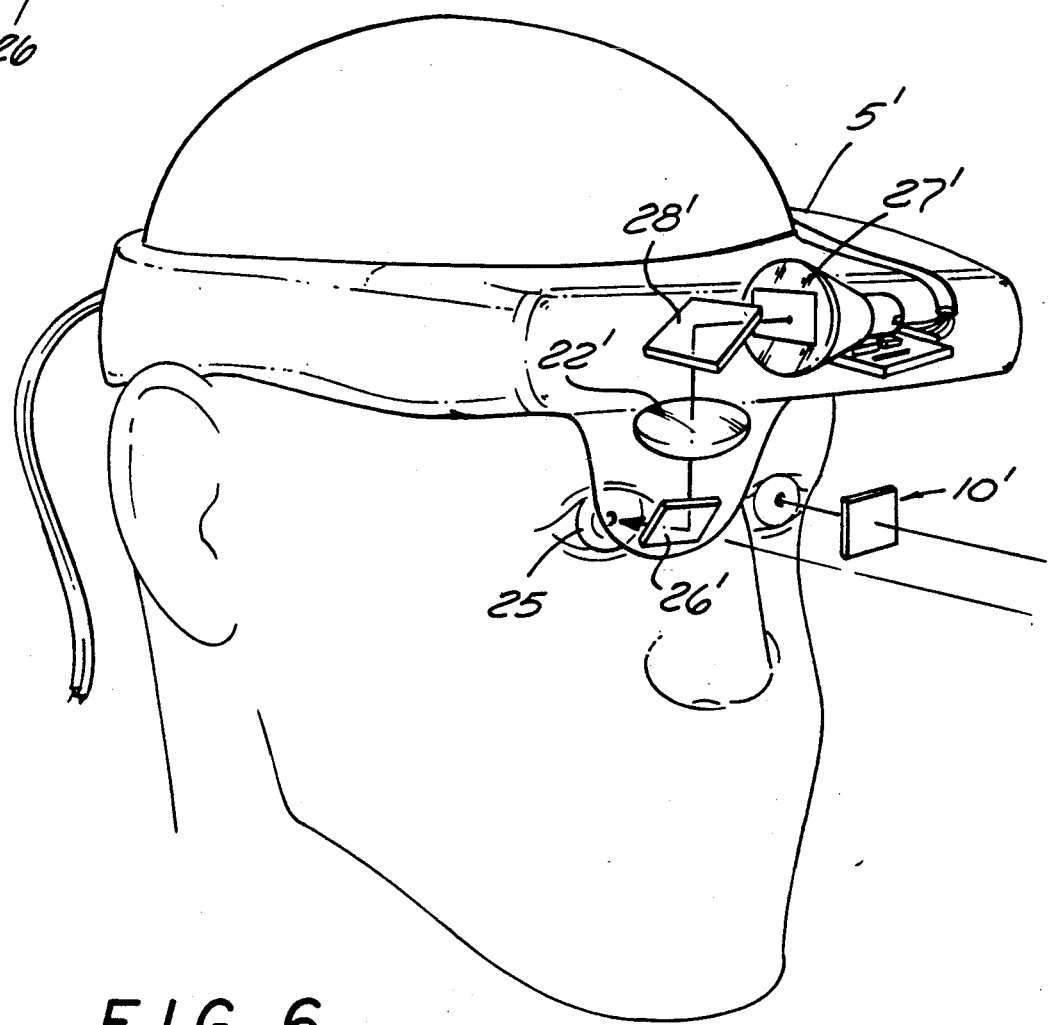
FIG. 6 is a schematic view of an alternative embodiment of the present invention disposed on a user.

In yet another alternate embodiment, shown in FIG. 6, the CRT 27' and optics are mounted toward the forehead of the wearer. The headband frame 5' still wraps around the skull as before. Also, the double convex lens 22' and the turning mirror 28' are in the same positions and function as in the preferred embodiment. As is clear from the drawing, the wearer's right sighting eye looks into the viewfinder final presentation mirror 26' while the vision out of his left non-sighting is partially blocked by the occlusion device 10'.

What is claimed is:

1. A helmet integrated display system adapted to mount on a wearer's head for combining visual images perceived by the wearer's sighting eye through a viewfinder and by the wearer's non-sighting eye, the system comprising:

a headbrace means adapted for mounting to the wearer's head, wherein the headbrace means supports the viewfinder to provide viewing by the sighting eye;

a video image means for generating the visual image from a video signal input, mounted to the viewfinder;

an optical means for converting the visual image from the video image means into a virtual image and projecting the virtual image, wherein the optical means is mounted to the viewfinder at a first predetermined distance away from the video image means;

a non-transparent reflecting means for directing the projected virtual image into a first predetermined portion of the sighting eye not more than about 30% of a field of view of the sighting eye, wherein the optical means is disposed between the reflecting means and the video image means, and wherein the reflecting means is mounted to the viewfinder; and an adjustable occlusion means set to a predetermined position with respect to the non-sighting eye for occluding a second predetermined portion of the non-sighting eye corresponding to not more than about 30% of a field of view of the non-sighting eye for matting out objects that would otherwise be perceived by the non-sighting eye in the second predetermined portion, wherein the occlusion means is mounted to the headbrace means.

2. The helmet integrated display system of claim 1, wherein the optical means is a double convex lens.

3. The helmet integrated display system of claim 1, wherein the first predetermined distance is less than a focal length of the optical means.

4. The helmet integrated display system of claim 1, wherein the video image means is a high resolution CRT.

5. The helmet integrated display system of claim 1, wherein the reflecting means is a plurality of mirrors disposed cooperatively in the viewfinder to transfer the visual image to the sighting eye.

6. The helmet integrated display system of claim 1, wherein the first predetermined distance can be adjusted by moving the video image means closer to or farther away from the optical means.

7. The helmet integrated display system of claim 1, wherein the occlusion means is attached to the headbrace means by a pivoting and telescoping shaft such that the occlusion means can be moved out of the field of view of the non-sighting eye.

8. The helmet integrated display system of claim 1, wherein the system further comprises high voltage circuits and CRT drive electronics enclosed in a housing mounted to the headbrace means for receiving a video signal from a video source.

9. The helmet integrated display system of claim 1, wherein the helmet integrated display system further comprises an RF receiver connected to the CRT drive electronics for receiving an RF video signal from the video source.

10. The helmet integrated display system of claim 1, wherein the first predetermined portion of the sighting eye is approximately 14%.

11. The helmet integrated system of claim 1, wherein the second predetermined portion of the non-sighting eye is approximately 14%.

12. The helmet integrated display system of claim 1, wherein the system further comprises an optical adjustment means for adjusting the size and position of the virtual image of the field of view of the sighting eye.

13. A method of presenting a visual image using a helmet integrated display system adapted for mounting on a wearer's head, wherein the system combines visual images perceived by the wearer's sighting eye through a viewfinder and by the wearer's non-sighting eye, the method comprising the steps of:

providing an input video signal;

converting the input video signal to a visible image through a video image means adapted for mounting on the wearer's head;

converting the visible image into a virtual image by refracting the visible image with a non-transparent reflecting mirror;

directing the virtual image through a viewfinder to a first predetermined portion of the sighting eye not to exceed 14% of a field of view of the sighting eye; and occluding a second predetermined portion of the non-sighting eye corresponding to not more than 14% of a field of view of the non-sighting eye.

14. The method of presenting a visual image using a helmet integrated display system according to claim 13 wherein the video image means is a high resolution CRT having a video display.

15. The method of presenting a visual image using a helmet integrated display system according to claim 14 wherein the step of converting the visible image is performed by an optical lens.

16. The method of presenting a visual image using a helmet integrated display system according to claim 15 wherein the step of directing the virtual image is performed by a plurality of mirrors.

17. The method of presenting a visual image using a helmet integrated display system according to claim 16 wherein the step of converting the visible image into the virtual image is performed by locating the display of the CRT a distance away from the optical lens that is less than a focal length of the optical lens.

18. A helmet integrated display system adapted to mount on a wearer's head for combining visual images perceived by the wearer's sighting eye through a viewfinder and by the wearer's non-sighting eye, the system comprising:

a frame adapted for mounting to the wearer's head having webbing disposed in a central portion;

a housing mounted to the frame including a high resolution CRT having a display screen, a first mirror, an optical lens disposed at a predetermined adjustable distance away from the display screen that is less than a focal length of the optical lens, and a non-transparent second mirror, wherein a visible image produced by the display screen is reflected by the first mirror to the optical lens which converts the visible image to a virtual image, which virtual image is completely reflected by the second mirror out of the housing through a viewfinder located substantially in front of the sighting eye and into a predetermined portion of the sighting eye corresponding to about 14% of a field of view of the sighting eye;

an occlusion means disposed on the frame to occlude a predetermined portion of the non-sighting eye corresponding to about 14% of a field of view of the non-sighting eye;

an aft electronics package attached to the annular frame containing a CRT drive board and high voltage circuitry connected to the high resolution CRT through a first cable;

a portable battery power and signal supply assembly, adapted for mounting to the wearer, for providing a NTSC video signal and a power signal to the aft electronics package through a second cable; and a video signal source connected to the portable battery and signal supply assembly through the second cable for providing the NTSC video signal.

* * * * *